Nov. 19, 1968  R. W. WACEK  3,412,270
MOTOR-FAN UNIT ASSEMBLY
Filed March 7, 1966
Fig. 1.
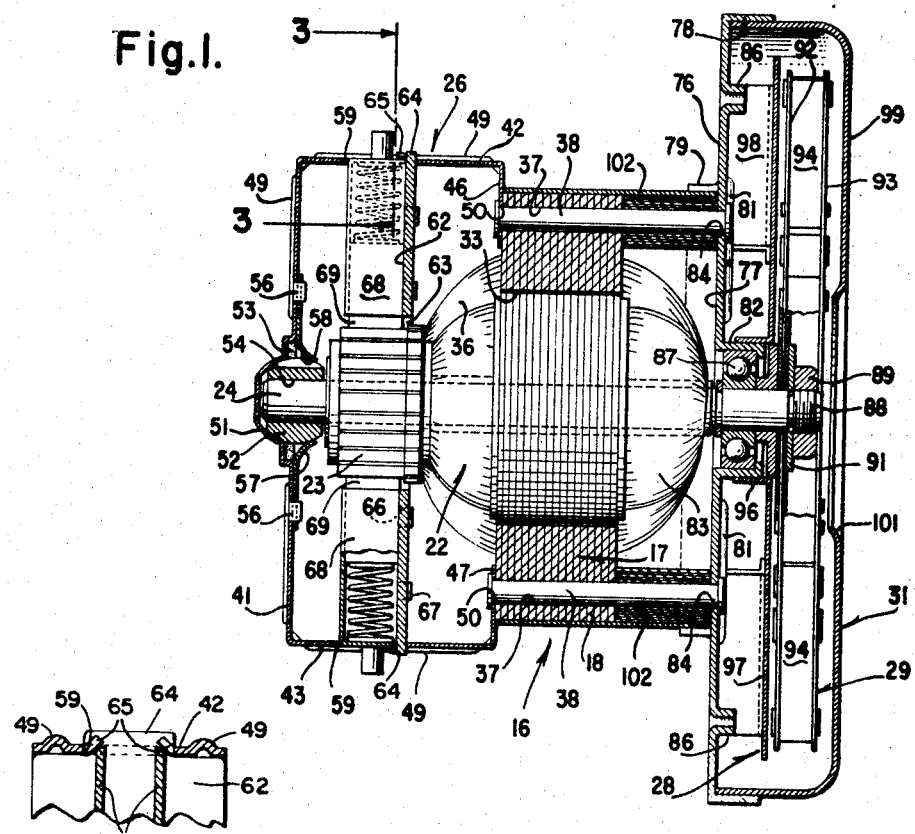
Fig. 3.
Fig. 2.
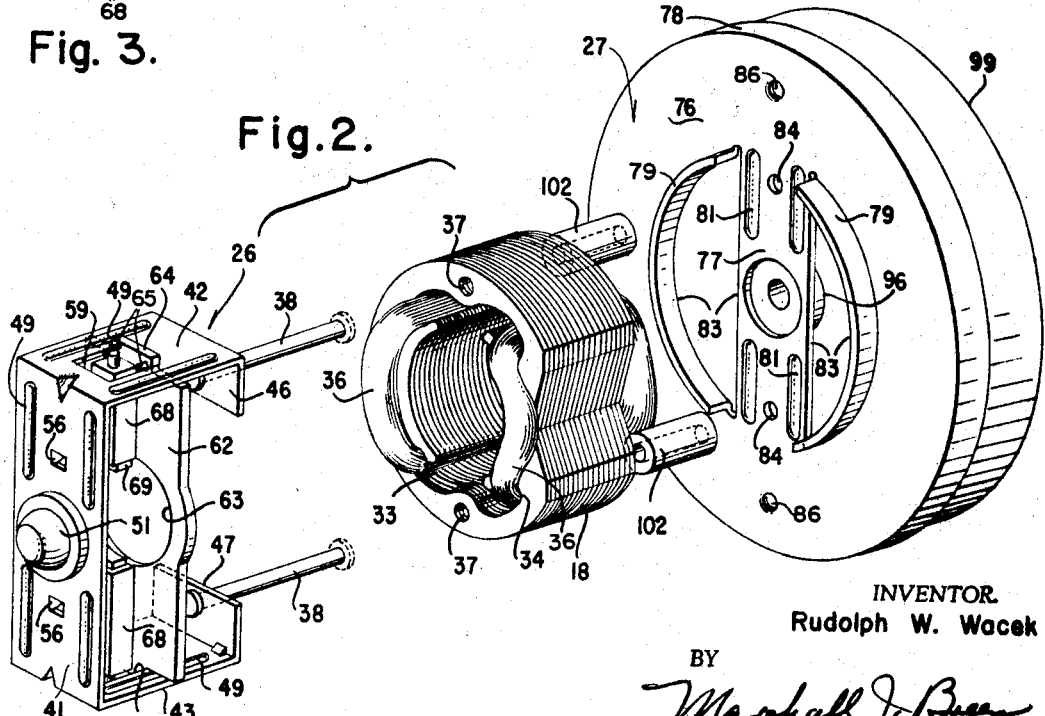
INVENTOR.
Rudolph W. Wacek
BY
*Marshall J. Breen*
ATTORNEY

United States Patent Office 3,412,270
Patented Nov. 19, 1968

3,412,270
MOTOR-FAN UNIT ASSEMBLY
Rudolph W. Wacek, Anderson, S.C., assignor to The Singer Company, New York, N.Y., a corporation of New Jersey
Filed Mar. 7, 1966, Ser. No. 532,143
6 Claims. (Cl. 310—66)

ABSTRACT OF THE DISCLOSURE

A motor-fan unit comprising a stator including a plurality of apertured stacked laminations, an armature, and a pair of brushes and brush holders carried by a brush-holder plate supported by an apertured end bracket disposed adjacent a commutator at one end of the stator, and at the other end of the stator is a fan assembly including an apertured plate. A pair of fastening members pass through the apertures provided in the fan assembly plate, the stator laminations and the end bracket for clamping them together.

Summary of the invention

This invention relates to unitary motor driven fan units and more particularly to a low cost motor-fan unit that is especially adapted for use with small, vacuum cleaners, and the primary object of the present invention is to provide an improved device of this character.

Another object of the invention is to provide an improved motor-fan unit which is easy to manufacture and easy to assemble but which at the same time is rugged enough to provide satisfactory service for a long period of time.

A further object of the invention is to provide an improved motor-fan unit in which a brush holder is secured into an end bracket by the simple operation of springing the bracket and twisting a few tabs.

A still further object of the invention is to provide an improved motor-fan unit in which the various parts are advantageously held together by rivets.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Brief description of the drawings

In the drawings:

FIG. 1 is a longitudinal sectional view taken substantially on the center line of a motor-fan unit embodying the present invention.

FIG. 2 is a reduced scale exploded perspective view illustrating, in more detail, certain parts of the motor-fan unit shown in FIG. 1, and FIG. 3 is an enlarged sectional view taken on the line 3—3 of FIG. 1.

Description of the prepared embodiment

Referring more specifically to the drawings, the invention has been illustrated as being embodied in a motor-fan unit 16 having a stator 17 formed from a plurality of stacked laminations 18, a conventional wound armature 22 having a commutator 23 and a shaft 24, a combined brush support and bearing end bracket 26, a combined fan and bearing end bracket 27, a stationary fan 28, a rotatable fan assembly 29, and a fan shell 31.

The laminations 18 of the stator 17 are provided with several apertures, including a central concentric aperture 33 for accommodating the armature 22, a plurality of apertures 34 for accommodating stator windings 36—36, and apertures 37—37 for accommodating a pair of rivets 38—38 hereinafter to be discussed.

The end bracket 26 is substantially in the form of an elongated rectangular parallelepiped sheet metal box having two completely open sides and one partly open end, and the structural portion of the bracket 26 comprises an end wall 41, a top wall 42, (FIG. 1), a bottom wall 43, and two part-end-walls 46 and 47. One edge of the part-end-wall 46 is formed integral with one edge of the top wall 42 (FIG. 2) and the other edge of the top wall 42 is formed integral with the top edge of end wall 41. The bottom edge of the end wall 41 is integral with one edge of the bottom wall 43 and the other end of the bottom wall 43 is integral with one edge of the part-end-wall 47. The end wall 41, the top wall 42, and the bottom wall 43 are reinforced with stiffening ribs 49. Each part-end-wall 46 and 47 is formed with a hole 50 through which the rivets 38—38 pass.

The end wall 41, at a location half way between its top and bottom edges (FIGS. 1 and 2) is formed with a pressed out cup shaped protuberance 51 adapted to accommodate one end of a self-aligning part-spherical bearing 52 and an annular felt oil retainer 53, the bearing 52 having a cylindrical hole 54 for receiving one end of the shaft 24. The end wall 41 also has a pair of pressed in tabs 56—56 located equal distances above and below the protuberance 51, and these tabs secure in place opposite ends of a bearing retainer 57 the central portion of which has a part spherical depression 58 designed to press the bearing 52 into the hollow of the protuberance 51.

The top wall 42 and the bottom wall 43 are formed with rectangular openings 59—59 which are in register with one another, and the top wall 42, the bottom wall 43 in cooperation with the openings 59—59 and other means presently to be described function to properly position and hold an insulating brush-holder plate 62 in proper position with respect to the commutator 23. The plate 62 is formed with a circular aperture 63 which is slightly larger than the outer diameter of the commutator 23 and both the upper and lower ends of the plate 62 are formed with reduced lugs 64—64 of such size and shape as to snugly fit into the openings 59—59. Also, the top and bottom walls 42 and 43 are each formed with a pair of tabs 65—65 which are located adjacent to the apertures 59—59 and so positioned that they can be bent over to engage the lugs 64—64 on the ends of the brush-holder plate 62 thereby holding the same in place. At locations between the aperture 63 and the lugs 64 and 64 the plate 62 is provided with a plurality of holes 66 for receiving tabs 67 formed on opposite edges of brush tubes 68—68 of conventional design. The tubes 68—68 slidably house a pair of rectangular spring pressed carbon brushes 69—69 the ends of which engage the commutator 23.

The combined fan and bearing end bracket 27 comprises an annular plate 76 formed with a diameter bar 77, an outer rim flange 78 and two part-semicircular inner flanges 79—79, the flanges 79—79 extending from an opposite face of the plate 76 than from which the flange 78 extends. The diameter bar 77 is reinforced with a plurality of stiffening ribs 81 and the center of the bar 77 is formed with an integral concentrically located apertured bearing receiving cup 82. The two flanges 79—79 and the diameter bar 77 define a pair of segmental apertures 83—83. The diameter bar 77 has two holes 84—84 for accommodating the rivets 38—38 and the annular plate 76 has mounting holes 86. The cup 82 receives a conventional ball bearing 87 the inner race of which is mounted on the shaft 24, and the end of the shaft 24 is threaded as at 88 to receive a nut 89 for holding a washer 91 and the rotatable fan assembly 29 to the end of the shaft 24. The fan assembly 29 comprises a pair of spaced circular fan plates 92 and 93 connected by a plurality of radially extending fan blades 94.

The external cylindrical surface of the bearing receiving cup 82 mates with a collar 96 providing the central opening of a circular baffle plate 97 one face of which carries a plurality of stationary radially extending stationary air vanes 98. The external surface of a portion of a cup shaped metallic shell 99 mates with the internal surface of the flange 78 and the shell 99 is formed with a concentrically located air inlet opening 101. A pair of tubular spacers 102—102 are provided for properly positioning the annular plate 76 with respect to the stator 17.

The motor fan unit 16 is assembled in the following manner. The armature 22 with its commutator 23, shaft 24, etc., and the stator 17 with its laminations 18 and windings 36 are assembled. Next, the previously formed brush and bearing end bracket 26 complete with its bearing 52 is sprung in such a manner that the part-end-walls 46 and 47 move away from one another. When the end bracket 26 is sufficiently sprung, the previously assembled brush-holder plate 62 is placed between the top and bottom walls 42 and 43 and in line with the openings 59—59. Then the bracket 26 is allowed to assume its original shape so that the lugs 64—64 enter the openings 59—59. Next, the lugs 64—64 are moved to the ends of the openings 59—59 adjacent to the walls 46–47 and the tabs 65—65 are bent over as shown in FIG. 3 until they engage and hold the plate 62 in place. Next, the end of the shaft 24 is placed into the bearing 52 and one end of the stack of laminations 18 is placed against the outer faces of the part-end-walls 46 and 47 making sure that the apertures 37—37 register with the holes 50—50. Then the rivets 38—38 are passed through the holes 84—84 of the plate 76 and the rivets are fitted with the spacers 102—202 after which the rivets are passed through the apertures 37—37 and the holes 50—50 and the rivets are formed with heads. As above described, the rivets 38—38 are, during the above described operation, headed at both ends, however it will be understood that rivets having a preformed head on one end may be used if desired.

Having thus set forth the nature of this invention, what I claim herein is:

1. A combined motor-fan unit comprising a stator formed from a plurality of apertured stacked laminations and a winding supported by said laminations; a first end bracket in the form of an elongated box having an end wall, an apertured top wall, an apertured bottom wall, and two apertured part-end-walls, said part-end-walls being located adjacent to one end of said stacked laminations; a bearing carried by the end wall of said first end bracket, an insulating brush-holder plate supported by the top and bottom walls of said first end bracket; a pair of brush holders and brushes carried by said brush-holder plate; a second end bracket in the form of a fan assembly having an apertured plate, one face of which is located adjacent to the other end of said stacked laminations; a bearing carried by the plate of said second end bracket; an armature having a shaft supported by said bearings and having a commutator engageable by said brushes; a fan assembly carried by the shaft of said armature; and a pair of fastening members passing through apertures in said two part-end-walls, through apertures in said laminations, and through apertures in the plate of said second end bracket, said fastening members functioning to clamp said end brackets and said laminations together.

2. A combined motor-fan unit constructed in accordance with claim 1 in which one of the end brackets is spaced from said laminations by spacers.

3. A combined motor-fan unit constructed in accordance with claim 1 in which the ends of the brush-holder plate have lugs adapted to enter the apertures in the top and bottom walls of said first end bracket.

4. A combined motor-fan unit constructed in accordance with claim 1 in which the ends of the brush-holder plate have lugs adapted to enter the apertures in said top and bottom walls and in which said first end bracket has tabs for holding said brush-holder plate in place.

5. In combination as set forth in claim 1 wherein said insulating brush-holder plate is formed with lugs adapted to enter the apertures in the top and bottom walls of said end bracket, and a plurality of tabs carried by said end bracket and being bendable to positions to hold the lugs of said brush-holder plate in the apertures of said end bracket walls.

6. The combination in accordance with claim 5 wherein the end bracket is constructed and arranged to be sprung whereby the distance between the top wall and the bottom wall is adapted to be enlarged sufficiently to receive said brush-holder plate with said lugs disposed in register with said top and bottom apertures respectively, whereupon said end bracket may be allowed to return to its normal position.

References Cited
UNITED STATES PATENTS

| 1,156,874 | 10/1915 | Barnes | 310—66 |
| 1,511,348 | 10/1924 | Kaisling | 310—66 |
| 1,958,900 | 5/1934 | Marbury | 310—66 |
| 2,184,446 | 12/1939 | Snyder | 310—66 |
| 2,357,053 | 8/1944 | Moeller | 310—66 |
| 2,429,774 | 10/1947 | Schultz | 310—66 |
| 2,460,752 | 2/1949 | Jacobsen | 310—227 |
| 2,466,267 | 4/1949 | Pace. | |
| 2,590,877 | 4/1952 | Lindberg | 310—66 |
| 3,026,432 | 3/1962 | Baumhart | 310—227 |

FOREIGN PATENTS 647,483  8/1962  Canada.

J. D. MILLER, *Primary Examiner.*